Figure 1:
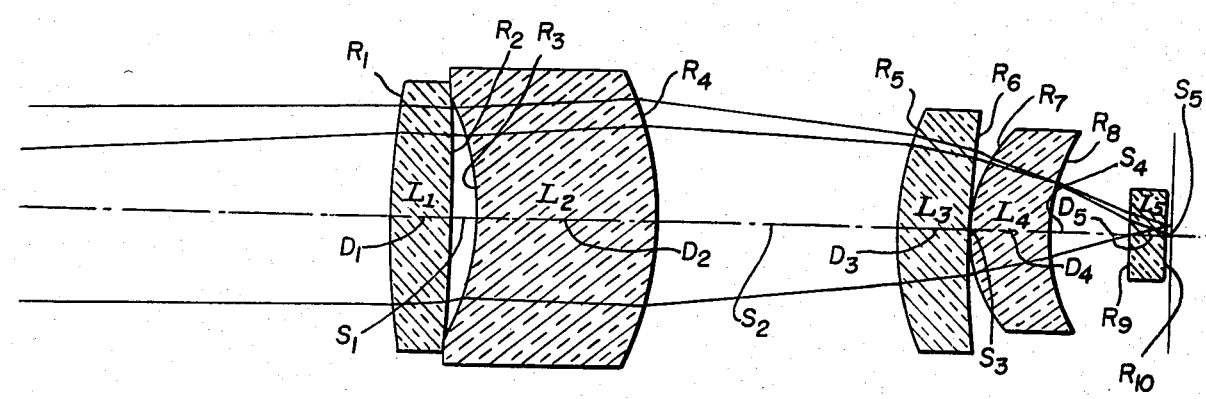

United States Patent [19]
Fleischman

[11] 3,944,338
[45] Mar. 16, 1976

[54] SHORT FOCAL LENGTH LONG BACK FOCUS OBJECTIVE

[75] Inventor: Andor A. Fleischman, Northbrook, Ill.

[73] Assignee: Bell & Howell Company, Chicago, Ill.

[22] Filed: Nov. 11, 1974

[21] Appl. No.: 522,655

[52] U.S. Cl............ 350/220; 350/175 NG; 350/176; 350/204
[51] Int. Cl.² ........................................ G02B 9/34
[58] Field of Search............. 350/220, 175 NG, 176

[56] References Cited
UNITED STATES PATENTS

| | | | |
|---|---|---|---|
| 3,450,463 | 6/1969 | Yasuda | 350/215 X |
| 3,612,661 | 10/1971 | Determann et al. | 350/220 X |

Primary Examiner—John K. Corbin
Attorney, Agent, or Firm—John E. Peele, Jr.

[57] ABSTRACT

This invention relates to a short focal length, large aperture optical system having a relatively long back focus primarily designed to efficiently transmit monochromatic light rays to an image plane with an extraordinarily high degree of correction over a prescribed field.

2 Claims, 9 Drawing Figures

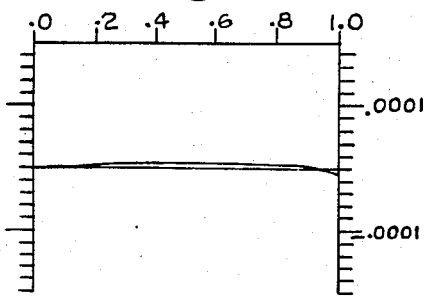
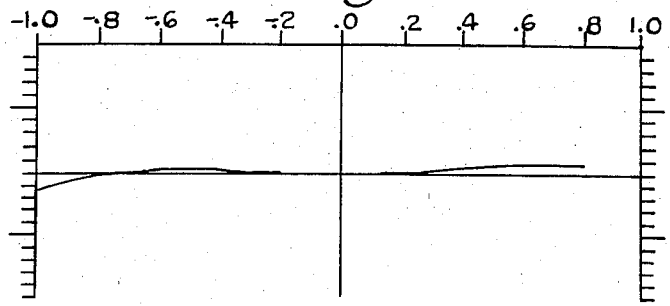
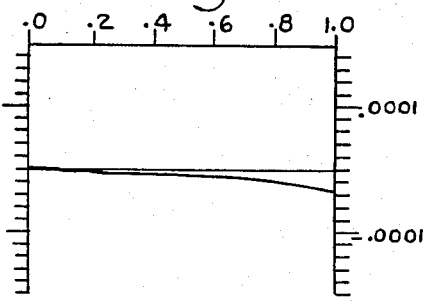
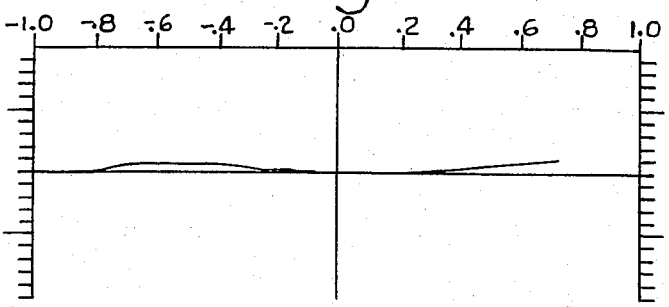
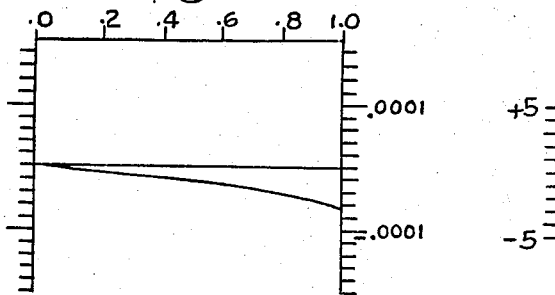
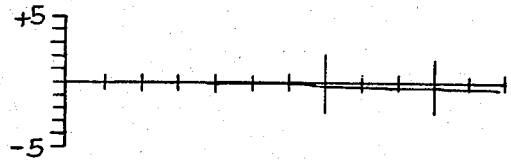
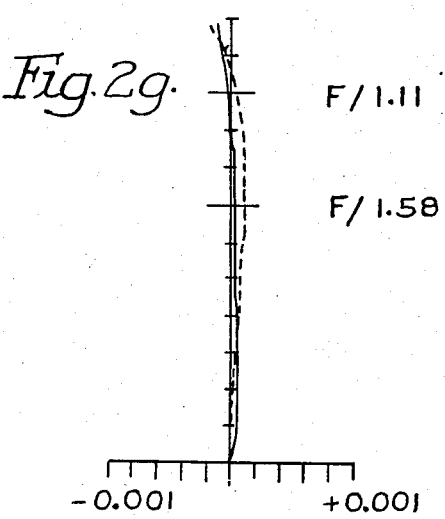
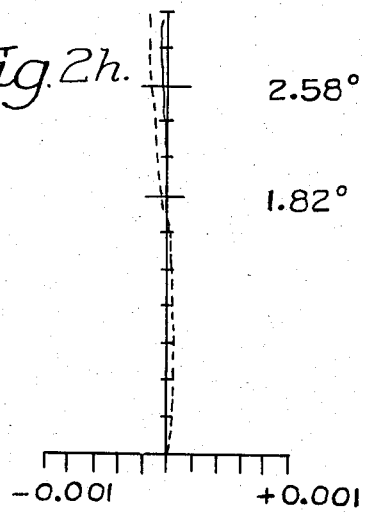

SHORT FOCAL LENGTH LONG BACK FOCUS OBJECTIVE

This invention relates to a short focal length, large aperture optical system having a relatively long back focus primarily intended for use in efficiently transmitting monochromatic light rays in optical instruments.

Optical systems have been designed to efficiently transmit light rays to an image plane with an extraordinarily high degree of correction over a prescribed field. The optical system is of short focal length with a relatively long back focus and high aperture to efficiently transmit light rays of a predetermined wavelength from a source of small size. The system is designed to image the light rays without degradation on an image plane at a smaller size than that of the source, in this instance, a low powered helium neon laser the beam of which is focused. This optical system is intended primarily for use in a mass-produced instrument, such as video disc player. The optical system is to be simple in design and assembly, relatively light weight and relatively low in cost, yet essentially diffraction limited over the prescribed field. The elements of this optical system are selected to be especially easily manufactured, further, the design is to have optimum performance characteristics and to provide an image of substantially better correction than might be anticipated notwithstanding anticipated tolerance variations during manufacture and assembly.

An object of the invention is to provide short focal length, relatively long back focus, high aperture optical system for efficient transmission of light rays of a predetermined wavelength from a light source of limited diameter and to image the rays without degradation on an image plane.

Other objects and advantages of the invention will become apparent from the detailed description which follows when taken in conjunction with the accompanying drawings in which:

FIG. 1 is a diagrammatic sectional view of a preferred optical system according to the present invention; and FIGS. 2a to 2h are graphical representations of the various aberrations of the lens system shown in FIG. 1 and having the design data given in Table 1.

Referring to the drawings; an optical system is shown for critically imaging light rays from a source having a limited diameter and essentially a single wavelength. In this preferred embodiment, the monochromatic light source is a focussed laser having an 0.8mm diameter beam and a wavelength of 6328 Angstroms. The arrangement of elements, configured as hereinafter described, provides for critically imaging the focussed beam to a point source of extremely small diameter, while providing a lightweight, highly corrected optical system which can be economically manufactured.

The all-glass optical system of FIG. 1 includes a first element $L_1$, starting at the ray entrance side of the system and positioned nearest the light source (not shown). The element is of positive power, and together with a negative element $L_2$, forms a positive component group which receives the rays of the light source.

The second element $L_2$ is axially separated and slightly air spaced from the first element $L_1$. The second element slightly diverges the light rays to ensure impingement onto an element $L_3$ of substantially all of the light rays exiting therefrom notwithstanding some slight decentering or misalignment between the optical axes of the elements which may occur during manufacture and/or assembly.

The third element $L_3$ is relatively widely air spaced from element $L_2$. Element $L_3$ is of slightly positive power and functions with a positive element $L_4$ as a positive power component group for relaying the light rays to the image plane, to form a reduced image of the object.

The optical design is shown with a protective cover $L_5$ of optical material to reduce potential damage to a surface carrying optically coded information at the image plane. By selected modifications of the radii of elements, $L_1$ to $L_4$, the design can be calculated for use without the protective cover or with a thinner or thicker cover as desired.

The optical system is a 8.17mm (0.3215 inch) focal length objective having an effective aperture of $f/1.10$, and a numerical aperture of 0.45. The system has a half angle of field of 2.58° and is essentially diffraction limited over this prescribed field. As seen in FIGS. 2a–2h which diagrammatically represent aberrations of the FIG. 1 optical system, a combined high degree of correction is obtained while maintaining an extremely short focal length and a larger effective aperture.

The optical values of the optical system of FIG. 1 are as folows:

TABLE 1

EFL = 8.17mm
½ Angle of Field = 2.58°

| LENS | RADII (IN.) | THICKNESS (IN.) | SPACING (IN.) |
|---|---|---|---|
| $L_1$ | $R_1 = .8800$ | $D_1 = .0750$ | |
| | $R_2 = 15.4000$ | | |
| | | | $S_1 = .0350$ |
| $L_2$ | $R_3 = -.3370$ | $D_2 = .2230$ | |
| | $R_4 = .4120$ | | |
| | | | $S_2 = .3100$ |
| $L_3$ | $R_5 = .4310$ | $D_3 = .0960$ | |
| | $R_6 = -6.6720$ | | |
| | | | $S_3 = .0040$ |
| $L_4$ | $R_7 = .1750$ | $D_4 = .0940$ | |
| | $R_8 = -.2450$ | | |
| | | | $S_4 = .1000$ |
| | | | (.1545 BFL) |
| $L_5$ | $R_9 = $ Inf. | $D_5 = .0492$ | |
| | $R_{10} = $ Inf. | | |
| | | | $0 \leq S_5 \leq .0053$ |

For ELEMENTS $L_1$, $L_3$ V = 25.4 $N_D$ = 1.805
For ELEMENTS $L_2$, $L_4$ V = 66.1 $N_D$ = 1.494
ELEMENT $L_5$ — OPTICAL MATERIAL

In the above table, the first column lists the lens elements numerically starting at the ray entrance side of the system. The elements have the dispersive index V and the refractive index $N_D$ as listed at the bottom of the table. The second column lists the radii for the respective surfaces of the elements the + values of the radii indicating surfaces which are convex and the − values of the radii indicating surfaces which are concave. The third column lists the thickness of the respective elements. The fourth column lists the axial spacings between the respective elements and the nominal image plane. The cover plate (element $L_5$) is located in the space considered the back focus (BFL) from the surface of the last "active" element. "EFL" is the effective focal length of the lens system. "½ Angle of Field" is the angle between the continuation of the lens axis and a line from the nodal point of the lens to the most oblique point recorded on the film.

FIGS. 2a to 2h graphically represent various aberrations of this form of the optical system, as shown in FIG. 1 and having the design data recited in Table 1.

FIG. 2a represents monochromatic correction of the rays on axis. FIG. 2b represents off axis aberrations of a ray passing from the zone of the film format and through the lens transversely and tangentially. FIG. 2c represents the aberrations of the rays passing from the corner of the film format through the lens tangentially and transversely. FIG. 2d represents the radial or longitudinal aberrations from the zone of the film format of rays entering the lens at 3 o'clock, while FIG. 2e represents similar aberrations from full field or corner rays. FIG. 2f represents distortion as a percentage of a "perfect" image. FIG. 2g represents the spherical aberrations by a full line and the offense-against-sine-condition by the dotted line. FIG. 2h represents the curvature of field with tangential curvature being shown in full line and sagittal curvature being shown in dashed line.

Alternatively, a lens design of configuration similar to the design in FIG. 1 has non-glass elements in combination with glass elements as set forth in Table 2. Since the degree of correction of this design is essentially identical with the degree of correction of FIG. 1, shown in the graphs of FIGS. 2a to 2h, the graphs are not repeated for the Table 2 design. Similarly, the optical system is an 8.17mm (0.3215 inch) focal length objective having an effective aperture of $f/1.15$ and a numerical aperture of 0.45.

TABLE 2

EFL = 8.17mm
½ Angle of Field = 2.58°

| LENS | RADII (IN.) | THICKNESS (IN.) | SPACING (IN.) |
|---|---|---|---|
| $L_1$ | $R_1 = .8800$<br>$R_2 = 15.4000$ | $D_1 = .0810$ | |
| | | | $S_1 = .350$ |
| $L_2$ | $R_3 = -.3370$<br>$R_4 = .4120$ | $D_2 = .2250$ | |
| | | | $S_2 = .3110$ |
| $L_3$ | $R_5 = .4310$<br>$R_6 = -6.6720$ | $D_3 = .0880$ | |
| | | | $S_3 = .0040$ |
| $L_4$ | $R_7 = .1715$<br>$R_8 = -.2450$ | $D_4 = .0970$ | |
| | | | $S_4 = .1000$<br>(.1535 BFL) |
| $L_5$ | $R_9 = $ Inf.<br>$R_{10} = $ Inf. | $D_5 = .0492$ | |

$0 \leq S_5 \leq .1044$
For ELEMENTS $L_1$, $L_3$ V = 25.4 $N_D$ = 1.805
For ELEMENTS $L_2$, $L_4$ V = 57.4 $N_D$ = 1.490
ELEMENT $L_5$ — OPTICAL MATERIAL

What is claimed is:
1. An optical system of relatively short focal length and large aperture having a relatively long back focus and substantially the following specification:

EFL = 8.17mm (.3215 inch)
½ Angle of Field = 2.58°

| LENS | RADII (IN.) | THICKNESS (IN.) | SPACING (IN.) |
|---|---|---|---|
| $L_1$ | $R_1 = .8800$<br>$R_2 = 15.4000$ | $D_1 = .0750$ | |
| | | | $S_1 = .0350$ |
| $L_2$ | $R_3 = -.3370$<br>$R_4 = .4120$ | $D_2 = .2230$ | |
| | | | $S_2 = .3100$ |
| $L_3$ | $R_5 = .4310$<br>$R_6 = -6.6720$ | $D_3 = .0960$ | |
| | | | $S_3 = .0040$ |
| $L_4$ | $R_7 = .1750$<br>$R_8 = -.2450$ | $D_4 = .0940$ | |
| | | | $S_4 = .1000$<br>(.1545 BFL) |
| $L_5$ | $R_9 = $ Inf.<br>$R_{10} = $ Inf. | $D_5 = .0492$ | |

$0 \leq S_5 \leq .0053$
For ELEMENTS $L_1$, $L_3$ V = 25.4 $N_D$ = 1.805
For ELEMENTS $L_2$, $L_4$ V = 66.1 $N_D$ = 1.494
ELEMENT $L_5$ — OPTICAL MATERIAL wherein the first column lists the lens elements numerically starting at the ray entrance side of the system which elements each have the dispersive index V and the refractive index $N_D$; the second column lists the respective base radii $R_1$ to $R_{10}$; the third column lists the thickness $D_1$ to $D_5$ of the respective elements; and the fourth column lists the axial spacings $S_1$ to $S_5$ between the respective elements, and the image plane.

2. An optical system of relatively short focal length and large aperture having a relatively long back focus and substantially the following specification:

EFL = 8.17mm
½ Angle of Field = 2.58°

| LENS | RADII (IN.) | THICKNESS (IN.) | SPACING (IN.) |
|---|---|---|---|
| $L_1$ | $R_1 = .8800$<br>$R_2 = 15.4000$ | $D_1 = .0810$ | |
| | | | $S_1 = .350$ |
| $L_2$ | $R_3 = -.3370$<br>$R_4 = .4120$ | $D_2 = .2250$ | |
| | | | $S_2 = .3110$ |
| $L_3$ | $R_5 = .4310$<br>$R_6 = -6.6720$ | $D_3 = .0880$ | |
| | | | $S_3 = .0040$ |
| $L_4$ | $R_7 = .1715$<br>$R_8 = -.2450$ | $D_4 = .0970$ | |
| | | | $S_4 = .1000$<br>(.1535 BFL) |
| $L_5$ | $R_9 = $ Inf.<br>$R_{10} = $ Inf. | $D_5 = .0492$ | |

$0 \leq S_5 \leq .1044$
For ELEMENTS $L_1$, $L_3$ V = 25.4 $N_D$ = 1.805
For ELEMENTS $L_2$, $L_4$ V = 57.4 $N_D$ = 1.490
ELEMENT $L_5$ — OPTICAL MATERIAL wherein the first column lists the lens elements numerically starting at the ray entrance side of the system which elements each have the dispersive index V and the refractive index $N_D$; the second column lists the respective base radii $R_1$ to $R_{10}$; the third column lists the thickness $D_1$ to $D_5$ of the respective elements; and the fourth column lists the axial spacings $S_1$ to $S_5$ between the respective elements, and the image plane.

* * * * *